(12) United States Patent
Lee et al.

(10) Patent No.: US 8,358,718 B2
(45) Date of Patent: Jan. 22, 2013

(54) APPARATUS AND METHOD FOR DETERMINING OPTIMUM INTEGER PERTURBATION VECTOR OF LOW COMPLEXITY IN MULTIPLE ANTENNA SYSTEM

(75) Inventors: Sung-Ho Lee, Seoul (KR); Keun-Chul Hwang, Yongin-si (KR); Soon-Young Yoon, Seoul (KR); In-Kyu Lee, Seoul (KR); Seok-Hwan Park, Hanam-si (KR)

(73) Assignees: Samsung Electronics Co., Ltd., Suwon-si (KR); Korea University Research and Business Foundation, Seoul (KR)

( * ) Notice: Subject to any disclaimer, the term of this patent is extended or adjusted under 35 U.S.C. 154(b) by 374 days.

(21) Appl. No.: 12/798,185

(22) Filed: Mar. 30, 2010

(65) Prior Publication Data

US 2010/0254487 A1    Oct. 7, 2010

(30) Foreign Application Priority Data

Apr. 2, 2009    (KR) .................... 10-2009-0028380

(51) Int. Cl.
*H04L 27/00* (2006.01)

(52) U.S. Cl. ........ 375/295; 375/267; 375/299; 370/334; 455/101

(58) Field of Classification Search .................. 375/267, 375/295, 299; 455/101; 370/334
See application file for complete search history.

(56) References Cited

U.S. PATENT DOCUMENTS

| 7,899,421 | B2 * | 3/2011 | Zheng et al. ............... 455/166.2 |
| 7,917,100 | B2 * | 3/2011 | Zheng et al. ............... 455/101 |
| 2005/0147183 | A1 * | 7/2005 | Willink ........................ 375/299 |
| 2009/0122906 | A1 * | 5/2009 | Mroueh et al. ............... 375/295 |
| 2009/0238304 | A1 * | 9/2009 | Vetter et al. .................. 375/295 |

* cited by examiner

*Primary Examiner* — Ted Wang (57) ABSTRACT

An apparatus and a method for determining an optimum integer perturbation vector of a low complexity in a multiple antenna system include a transmitter that transmits data using an optimum integer perturbation vector of a low complexity in a multiple antenna system includes a module pre-processor, a shift pre-processor, and a precoder. The modulo pre-processor adds an integer perturbation vector to a transmission signal vector. The shift pre-processor phase-shifts a pseudo inverse matrix of a channel matrix using a phase angle. The precoder precodes a transmission signal vector perturbed by the integer perturbation vector using the phase-shifted pseudo inverse matrix of the channel matrix.

11 Claims, 4 Drawing Sheets

APPARATUS AND METHOD FOR DETERMINING OPTIMUM INTEGER PERTURBATION VECTOR OF LOW COMPLEXITY IN MULTIPLE ANTENNA SYSTEM

CROSS-REFERENCE TO RELATED APPLICATION(S) AND CLAIM OF PRIORITY

The present application claims the benefit under 35 U.S.C. §119 to an application filed in the Korean Intellectual Property Office on Apr. 2, 2009 and assigned Serial No. 10-2009-0028380, the contents of which is herein incorporated by reference.

TECHNICAL FIELD OF THE INVENTION

The present invention relates to a multiple antenna system. More particularly, the present invention relates to an apparatus and a method for determining an optimum integer perturbation vector of a low complexity by representing a pseudo inverse matrix of a channel matrix and a transmission signal vector using real value representation, and decoupling real parts and imaginary parts of them in a multiple antenna system.

BACKGROUND OF THE INVENTION

Recently, a Multiple Input Multiple Output (MIMO) technique for supporting a high information transmission rate is widely used in a mobile communication field. Not only a point-to-point MIMO technique but also multiple user MIMO techniques where a base station simultaneously considers a plurality of users who transmit data to a plurality of terminals, are being actively studied. Unlike a point-to-point MIMO, under a multiple user environment, information has to be simultaneously transmitted to a plurality of users in order to raise a transmission efficiency. More particularly, in the case where the number of transmission antennas is greater than the number of reception antennas, information has to be simultaneously transmitted to a plurality of users in order to obtain a maximum multiplexing efficiency. At this point, one of problems that may occur is that a signal of a certain user may act as an interference to a different user. The technique for canceling this interference signal may be classified into a transmission end interference cancel technique and a reception end interference cancel technique depending on a location of canceling the signal. When the number of transmission antennas is one, a method of decoding a signal of a different user and then canceling the signal at a reception end is best, and a transmission end interference cancel technique is not required. In contrast, when the number of transmission antennas is two or more, a method of canceling an interference at a reception end is not best and a transmission end interference cancel technique needs to be used. A Dirty Paper Coding (DPC), which is one of transmission end interference cancel techniques, supports a maximum information transmission rate. However, the DPC has a problem of having a considerably high calculation complexity.

Therefore, a Vector Perturbation (VP) technique having a lower calculation complexity than that of the DPC has been suggested. The VP technique is a linear pre-processing technique based on zero-forcing. In the VP technique, a transmission end adds an integer perturbation vector to a desired signal vector in order to prevent a power boosting phenomenon.

As described above, the VP technique may obtain a performance gain compared to an existing linear technique by adding an integer perturbation vector before sending a signal via a transmission antenna, but requires a high calculation complexity during a process of finding out an optimum integer perturbation vector whenever a channel response and a data signal change.

Therefore, an apparatus and a method for determining an optimum integer perturbation vector requiring a low complexity in a multiple antenna system are required.

SUMMARY OF THE INVENTION

To address the above-discussed deficiencies of the prior art, it is a primary aspect of the present invention to solve at least the above-mentioned problems and/or disadvantages and to provide at least the advantages described below. Accordingly, an aspect of the present invention is to provide a transmitter/receiver and transmission/reception methods in a multiple antenna system.

Another aspect of the present invention is to provide an apparatus and a method for determining an optimum integer perturbation vector of a low complexity in a multiple antenna system.

In accordance with an aspect of the present invention, a transmitter for transmitting data using an optimum integer perturbation vector of a low complexity in a multiple antenna system is provided. The transmitter includes a modulo pre-processor for adding an integer perturbation vector to a transmission signal vector, a shift pre-processor for phase-shifting a pseudo inverse matrix of a channel matrix using a phase angle, and a precoder for precoding a transmission signal vector perturbed by the integer perturbation vector using the phase-shifted pseudo inverse matrix of the channel matrix.

In accordance with another aspect of the present invention, a transmitter for determining an optimum integer perturbation vector of a low complexity in a multiple antenna system is provided. The transmitter includes a decoupler for decoupling a first channel vector and a second channel vector of a pseudo inverse matrix of a channel matrix, and decoupling a real part and an imaginary part of a transmission signal vector, and a perturbation vector determination unit for determining a real value and an imaginary value of the integer perturbation vector independently based on a first Equation below by coupling with the decoupled first channel vector and the decoupled real part of the transmission signal vector, and coupling with the decoupled second channel vector and the decoupled imaginary part of the transmission signal vector:

$$R\{\tilde{l}_{opt}\} \approx \arg\min_{l \in Z^K} \left\| r - H_e \begin{bmatrix} 1_1 \\ \vdots \\ 1_K \end{bmatrix} \right\|^2 \&$$

$$I\{\tilde{l}_{opt}\} \approx \arg\min_{l \in Z^K} \left\| \dot{r} - \dot{H}_e \begin{bmatrix} 1_1 \\ \vdots \\ 1_K \end{bmatrix} \right\|^2$$

where $$r = \sum_{i=1}^{K} h_i^+ u_{i,I}, \; H_e = -\tau[h_1^+ \; \ldots \; h_K^+], \; \dot{r} = \sum_{i=1}^{K} h_i^+ u_{i,Q},$$

$$\dot{H}_e = -\tau[h_1^+ \; \ldots \; h_K^+]$$

In accordance with still another aspect of the present invention, a method for transmitting data using an optimum integer perturbation vector of a low complexity in a multiple antenna system is provided. The method includes adding an integer perturbation vector to a transmission signal vector, phase-shifting a pseudo inverse matrix of a channel matrix using a phase angle, and precoding a transmission signal vector perturbed by the integer perturbation vector using the phase-shifted pseudo inverse matrix of the channel matrix.

In accordance with further another aspect of the present invention, a method for determining an optimum integer perturbation vector of a low complexity in a multiple antenna system is provided. The method includes decoupling a first channel vector and a second channel vector of a pseudo inverse matrix of a channel matrix, and decoupling a real part and an imaginary part of a transmission signal vector, and determining a real value and an imaginary value of the integer perturbation vector independently based on a first Equation below by coupling with the decoupled first channel vector and the decoupled real part of the transmission signal vector, and coupling with the decoupled second channel vector and the decoupled imaginary part of the transmission signal vector:

$$R\{\tilde{l}_{opt}\} \approx \arg\min_{l \in Z^K} \left\| r - \dot{H}_e \begin{bmatrix} l_1 \\ \vdots \\ l_K \end{bmatrix} \right\|^2 \&$$

$$I\{\tilde{l}_{opt}\} \approx \arg\min_{l \in Z^K} \left\| \dot{r} - H_e \begin{bmatrix} l_1 \\ \vdots \\ l_K \end{bmatrix} \right\|^2$$

where $$r = \sum_{i=1}^{K} h_i^+ u_{i,I}, H_e = -\tau \lfloor h_1^+ \ \ldots \ h_k^+ \rfloor, \dot{r} = \sum_{i=1}^{K} h_i^+ u_{i,Q},$$

$$\dot{H}_e = -\tau \lfloor h_1^+ \ \ldots \ h_K^+ \rfloor$$

In accordance with yet another aspect of the present invention, an apparatus for determining an optimum integer perturbation vector of a low complexity in a multiple antenna system is provided. The apparatus includes a shift corrector that performs phase compensation on a reception signal vector, a modulo corrector that cancels an integer perturbation vector component by performing a modulo operation on the phase-compensated reception signal, and a demodulator that demodulates a relevant bit from the reception signal vector from which the integer perturbation vector component has been cancelled.

In accordance with yet further another aspect of the present invention, a method for determining an optimum integer perturbation vector of a low complexity in a multiple antenna system is provided. The method includes performing phase compensation on a reception signal vector, canceling an integer perturbation vector component by performing a modulo operation on the phase-compensated reception signal, and demodulating a relevant bit from the reception signal vector from which the integer perturbation vector component has been cancelled.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain exemplary embodiments of the present invention will be more apparent from the following description taken in conjunction with the accompanying drawings in which.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

Preferred embodiments of the present invention will be described herein below with reference to the accompanying drawings. In the following description, detailed descriptions of well-known functions or constructions will be omitted since they would obscure the invention in unnecessary detail. Also, the terms used herein are defined according to the functions of the present invention. Thus, the terms may vary depending upon a user's or operator's intentions or practices. Therefore, the terms used herein should be understood based on the descriptions made herein.

Exemplary embodiments of the present invention provide an apparatus and a method for determining an optimum integer perturbation vector of a low complexity in a multiple antenna system.

The integer perturbation vector is a complex vector whose real part and imaginary part are integers. Exemplary embodiments of the present invention propose a method for decoupling a real part and an imaginary part, and determining the integer perturbation vector in order to reduce a calculation complexity when determining the integer perturbation vector. In addition, exemplary embodiments of the present invention propose a pre-processing technique applicable at a transmitter in order to reduce a loss occurring when a real part and an imaginary part of the integer perturbation vector are decoupled.

Figure 1:
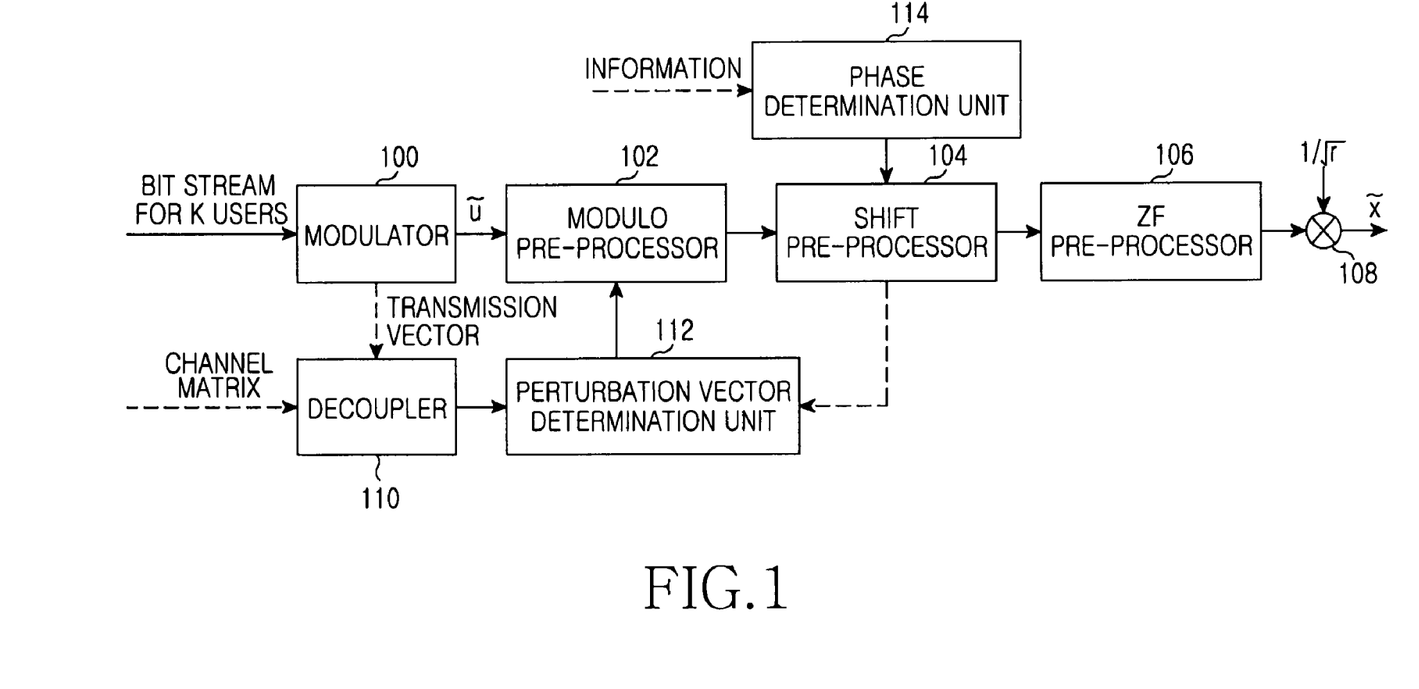
FIG. 1 illustrates a transmitter for determining an optimum integer perturbation vector of a low complexity in a multiple antenna system according to an exemplary embodiment of the present invention.

FIG. 1 illustrates a transmitter that determines an optimum integer perturbation vector of a low complexity in a multiple antenna system according to an exemplary embodiment of the present invention.

Referring to FIG. 1, the transmitter includes a modulator 100, a modulo pre-processor 102, a shift pre-processor 104, a Zero Forcing (ZF) pre-processor 106, a unitization unit 108, a decoupler 110, a perturbation vector determination unit 112, and a phase determination unit 114.

The modulator 100 receives a bit stream for K users from an upper layer and maps bits to modulation symbols for each stream according to a relevant modulation scheme. That is, the modulator 100 maps predetermined bits to constellation points according to a relevant modulation scheme. The modulation symbol or the constellation point is expressed in terms of a complex data signal.

The modulo pre-processor 102 receives K complex data signals (or modulation symbols), and receives the integer perturbation vector value from the perturbation vector determination unit 112 to perturb the complex data signal in order to prevent a transmission power increase phenomenon generated by ZF pre-processing (that is, to prevent an inverse matrix of a channel matrix from diverging). In other words, the modulo pre-processor 102 adds a complex integer vector (that is, an integer perturbation vector) multiplied by a constant T to the complex data signal.

The shift pre-processor 104 performs phase shift on K perturbed complex data signals output from the modulo pre-processor 102 using K phase angles provided from the phase determination unit 114. That is, the shift pre-processor 104 shifts a phase of a complex data signal by a phase angle for each of K user streams (referring to Equation 13 herein below)

The ZF pre-processor 106 multiples the complex data signal by a pseudo inverse matrix of a channel matrix phase-shifted by the shift pre-processor 104, and outputs the same to the unitization unit 108. The ZF pre-processor 106 cancels an interference between users by multiplying a transmission signal by the pseudo inverse matrix of the channel matrix and outputting the same.

The unitization unit 108 multiplies an output signal from the ZF pre-processor 106 by $1/\sqrt{\gamma}$, and transmits the same via M transmission antennas.

The decoupler 110 decouples real parts and imaginary parts of a channel matrix and a transmission signal vector modulated from the modulator 100, decouples a first channel vector and a second channel vector of a pseudo inverse matrix of the channel matrix (referring to Equation 8 below), and outputs them to the perturbation vector determination unit 112. Real parts and imaginary parts of the pseudo inverse matrix of the channel matrix and the transmission signal vector may be decoupled using real value representation.

The perturbation vector determination unit 112 determines a real value and an imaginary value of a perturbation vector using real parts and imaginary parts of the pseudo inverse matrix of the channel matrix and the transmission signal vector, decoupled by the decoupler 110, and provides them to the modulo pre-processor 102. At this point, the perturbation vector determination unit 112 determines an optimum integer perturbation vector using phase-shifted results of decoupled real parts and imaginary parts of the pseudo inverse matrix of the channel matrix and the transmission signal vector from the shift pre-processor 104 (referring to Equations 7 and 11 below).

To reduce a loss generated when the perturbation vector determination unit 112 decouples a real part and an imaginary part of the integer perturbation vector, the phase determination unit 114 determines phase angles $\theta_1, \ldots, \theta_K$ for respective K bit streams such that a real vector space and an imaginary vector space for a pseudo inverse matrix of a channel matrix are orthogonal. Here, an optimum phase angle may be calculated through a repetitive algorithm (referring to Equation 12). For example, an optimum phase value is determined for $\theta_1$ with $\theta_2, \ldots, \theta_K$ fixed, and then an optimum phase value is determined for $\theta_2$ with $\theta_1$ and $\theta_3, \ldots, \theta_K$ fixed. Likewise, optimum phase angles for phase angles $\theta_3, \ldots, \theta_K$ are determined with other phase angles excluding a relevant phase angle fixed (referring to Equation 17 below).

According to another exemplary embodiment, to calculate the phase angle, one of K phase angles is selected from a real vector space and fixed (that is, a phase angle is set to zero), and a phase angle is determined such that one pseudo inverse matrix corresponding to the selected phase angle of the real vector space, and K pseudo inverse matrixes corresponding to K phase angles of an imaginary vector space are orthogonal. In addition, one of K phase angles is selected from an imaginary vector space and fixed (that is, a phase angle is set to zero), and a phase angle is determined such that one pseudo inverse matrix corresponding to the selected phase angle of the imaginary vector space and K pseudo inverse matrixes corresponding to K phase angles of a real vector space are orthogonal (referring to Equation 18).

Figure 2:
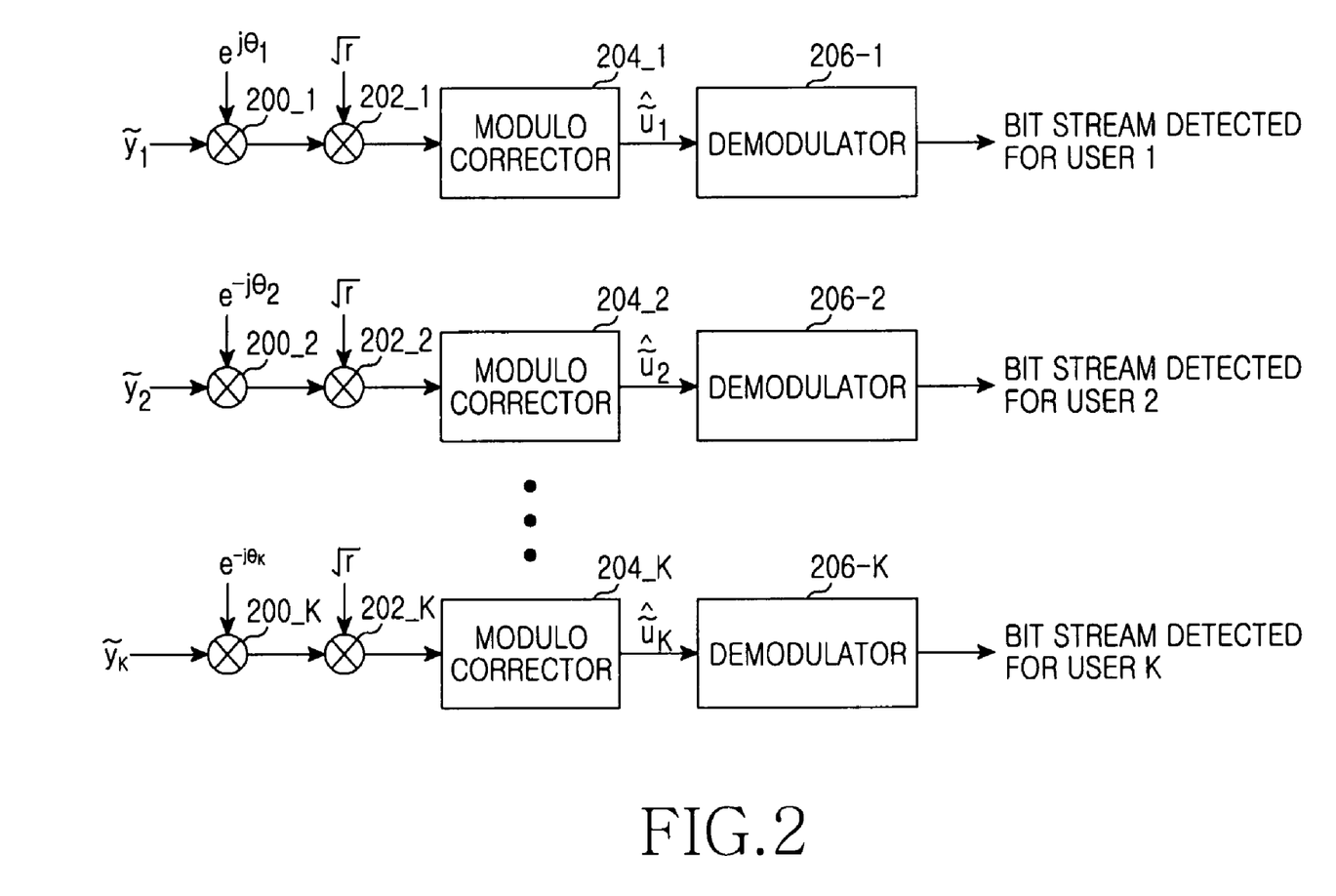
FIG. 2 illustrates a receiver for determining an optimum integer perturbation vector of a low complexity in a multiple antenna system according to an exemplary embodiment of the present invention.

FIG. 2 illustrates a receiver that determines an optimum integer perturbation vector of a low complexity in a multiple antenna system according to an exemplary embodiment of the present invention.

Referring to FIG. 2, the receiver includes shift correctors 200_1 to 200_K, unitization correctors 202_1 to 202_K, modulo correctors 204_1 to 204_K, and demodulators 206_1 to 206_K (an index K is an index of a user receiver). Each of K users receives a transmission signal via N reception antennas.

The shift correctors 200_1 to 200_K cancel an effect of a shift pre-process performed by a transmitter on a signal received via a reception antenna. In other words, since a phase shift has been performed for respective K bit streams in order to reduce system performance deterioration generated when the transmitter decouples a real part and an imaginary part of a pseudo inverse matrix of a channel matrix, the shift correctors perform compensation on the phase shift.

The unitization correctors 202_1 to 202_N multiply a reception signal by $\sqrt{\gamma}$ and outputs the same to the modulo correctors 204_1 to 204_K in order to cancel a unitization effect. In other words, since the transmitter multiplies a transmission signal by $1/\sqrt{\gamma}$ to meet a power limit condition, the receiver performs compensation by multiplying a reception signal by $\sqrt{\gamma}$.

The modulo correctors 204_1 to 204_K correct an effect of a modulo pre-process performed by the transmitter of FIG. 1. In other words, since the transmitter adds an integer perturbation vector to a transmission vector in order to prevent a power increase phenomenon generated by a ZF pre-process, the receiver cancels the integer perturbation vector added to the transmission vector through a modulo operation.

The demodulators 206_1 to 206_K receive a complex signal including an effect of a noise, and detect a relevant bit signal.

For clearer mathematical description, an entire reception signal vector of K dimensions (K streams) is expressed using Equation 1:

$$\tilde{y} = \tilde{H}\tilde{x} + \tilde{n} \quad \text{[Eqn. 1]}$$

where $\tilde{H}$ is a channel matrix, and $\tilde{x}$ is a transmission signal vector of M dimensions (M transmission antennas) and is a column vector listing signals transmitted via respective antennas, and $\tilde{n}$ is a vector of noises generated from a reception antenna. Elements of the vector are independent and comply with a normal distribution whose average is 0 and whose dispersion is $\sigma_n^2$. When a K-dimension vector listing complex signals corresponding to a bit stream of each user is denoted by $\tilde{u}$, a transmission signal vector is given by Equation 2:

$$\tilde{x} = \frac{1}{\sqrt{\gamma}} \tilde{H}^{+}(\tilde{u} + \tau \tilde{l}) \quad \text{[Eqn. 2]}$$

where $\tilde{H}^{+}$ is a pseudo inverse matrix of a channel matrix $\tilde{H}$ and is multiplied at the ZF pre-processor 106, and $1/\sqrt{\gamma}$ is a constant introduced to meet an entire power limit condition $E\|\tilde{x}\|^2 \leq 1$ and is calculated as $\gamma = E\|\tilde{H}^{+}(\tilde{u}+\tau \tilde{l})\|^2$, and is multiplied at the unitization unit 108.

At this point, after a transmission signal vector is preprocessed by the ZF pre-processor 106, a reception signal is given by Equation 3:

$$\tilde{y} = \frac{1}{\sqrt{\gamma}}(\tilde{u} + \tau \tilde{l}) + \tilde{n} \quad \text{[Eqn. 3]}$$

Consequently, an effective channel gain that determines an entire performance of a perturbation vector system when an effect of a modulo operation is not considered is given by $1/\sqrt{\gamma}$ for all users. When an entire channel matrix $\tilde{H}$ is ill-conditioned, that is, directionality between rows of $\tilde{H}$ is similar or sizes of rows are small, a consequently obtained $1/\sqrt{\gamma}$ value may be small, so that a system performance may reduce. To relieve the system performance, the modulo preprocessor 102 adds a complex integer vector multiplied by a constant to a complex data signal (or modulation symbol) as in Equation 4:

$$\tilde{u} + \tau \tilde{l} \quad \text{[Eqn. 4]}$$

where $\tilde{u}$ is a complex data signal corresponding to K user streams, $\tau$ is a positive real number, and $\tilde{l}$ is a complex integer vector.

The reason a complex integer vector instead of a general complex vector is added is to allow a receiver to correct an effect of addition of $\tau\tilde{l}$ based on a modulo operation and perform decoding.

Generally, a most difficult point in realizing a VP system is to determine an optimum perturbation vector $\tilde{l}_{opt}$ that may optimize a performance using Equation 5 when a channel matrix $\tilde{H}$ and a complex data vector $\tilde{u}$ are given. That is, the most difficult point is to calculate $\tilde{l}_{opt}$ that minimizes a $\gamma$ value.

$$\tilde{l}_{opt} = \arg\min_{\tilde{l} \in CZ^K} \|\tilde{H}^{+}(\tilde{u}+\tau\tilde{l})\|^2 \quad \text{[Eqn. 5]}$$

where $CZ^K$ is a set of K-dimension vectors whose real and imaginary parts are integers. To effectively calculate Equation 1, algorithms such as Sphere Encoding (SE) and Lattice-Reduction (LR) are used. Exemplary embodiments of the present invention provide a process that can effectively reduce a calculation complexity of SE and LR algorithms.

A function to be minimized in Equation 5 is defined as Equation 6:

$$C(\tilde{l}) = \|\tilde{H}(\tilde{u}+\tau\tilde{l})\|^2 = \left\| [\tilde{h}_1^{+} \ \ldots \ \tilde{h}_K^{+}] \begin{bmatrix} \tilde{u}_1 + \tau\tilde{l}_1 \\ \vdots \\ \tilde{u}_K + \tau\tilde{l}_K \end{bmatrix} \right\|^2 \quad \text{[Eqn. 6]}$$

where $\tilde{h}_i^{+}$ is an i-th column vector of $\tilde{H}_1^{+}$, and $\tilde{u}_i$ and $\tilde{l}_i$ are i-th elements of $\tilde{u}$ and $\tilde{l}$, respectively. Equation 6 may be expressed in terms of a real number system as in Equation 7:

$$C(\tilde{l}) = C_R(\tilde{l}) = \left\| [h_1^{+} \ \ldots \ h_K^{+} \ \dot{h}_1^{+} \ \ldots \ \dot{h}_K^{+}] \begin{bmatrix} u_{1,I} + \tau l_{1,I} \\ \vdots \\ u_{K,I} + \tau l_{K,I} \\ u_{1,Q} + \tau l_{1,Q} \\ \vdots \\ u_{K,Q} + \tau l_{K,Q} \end{bmatrix} \right\|^2 \quad \text{[Eqn. 7]}$$

$$= \left\| [h_1^{+} \ \ldots \ h_K^{+}] \begin{bmatrix} u_{1,I} + \tau l_{1,I} \\ \vdots \\ u_{K,I} + \tau l_{K,I} \end{bmatrix} + [\dot{h}_1^{+} \ \ldots \ \dot{h}_K^{+}] \begin{bmatrix} u_{1,Q} + \tau l_{1,Q} \\ \vdots \\ u_{K,Q} + \tau l_{K,Q} \end{bmatrix} \right\|^2$$

where, for an arbitrary complex number $\tilde{a}$, $a_I$ and $a_Q$ are a real part and an imaginary part of $\tilde{a}$, respectively, and $h_i^{+}$ and $\dot{h}_i^{+}$ are defined by Equation 8:

$$h_i^{+} = [R\{\tilde{h}_i^{+}\}^T I\{\tilde{h}_i^{+}\}^T]^T, \ \dot{h}_i^{+} = [-I\{\tilde{h}_i^{+}\}^T R\{\tilde{h}_i^{+}\}^T]^T \quad \text{[Eqn. 8]}$$

$\tilde{l}_{opt}$ obtained using Equation 5 is expressed in terms of a real number system function as in Equation 9:

$$\tilde{l}_{opt} = \arg\min_{\tilde{l} \in CZ^K} C_R(\tilde{l}) \quad \text{[Eqn. 9]}$$

$$= \arg\min_{\tilde{l} \in CZ^K} \left\| [h_1^{+} \ \ldots \ h_K^{+}] \begin{bmatrix} u_{1,I} + \tau l_{1,I} \\ \vdots \\ u_{K,I} + \tau l_{K,I} \end{bmatrix} + [\dot{h}_1^{+} \ \ldots \ \dot{h}_K^{+}] \begin{bmatrix} u_{1,Q} + \tau l_{1,Q} \\ \vdots \\ u_{K,Q} + \tau l_{K,Q} \end{bmatrix} \right\|^2$$

Here, to obtain an optimum perturbation vector using Equation 9, 2K integers have to be searched for simultaneously. Therefore, an exemplary embodiment of the present invention proposes a method for decoupling integers corresponding to a real part and integers corresponding to an imaginary part as in Equation 10 and calculating $\tilde{I}_{opt}$ in order to reduce a complexity in calculation.

$$R\{\tilde{I}_{opt}\} \approx \arg\min_{l \in Z^K} \left\| r - H_e \begin{bmatrix} 1_1 \\ \vdots \\ 1_K \end{bmatrix} \right\|^2 \& \qquad [\text{Eqn. 10}]$$

$$I\{\tilde{I}_{opt}\} \approx \arg\min_{l \in Z^K} \left\| \dot{r} - \dot{H}_e \begin{bmatrix} 1_1 \\ \vdots \\ 1_K \end{bmatrix} \right\|^2$$

Here, r and $\dot{r}$, and $H_e$ and $\dot{H}_e$ are given by Equation 11:

$$r = \sum_{i=1}^{K} h_i^+ u_{i,I}, \; H_e = -\tau[h_1^+ \; \ldots \; h_k^+], \; \dot{r} = \sum_{i=1}^{K} \dot{h}_i^+ u_{i,Q}, \qquad [\text{Eqn. 11}]$$

$$\dot{H}_e = -\tau[\dot{h}_1^+ \; \ldots \; \dot{h}_K^+]$$

When a real part and an imaginary part are decoupled in order to calculate $\tilde{I}_{opt}$ in Equation 10 instead of Equation 5, a considerable amount of calculation gains is obtained, but a performance deterioration may occur. In this case, when a condition of Equation 12 is met, a performance deterioration may be reduced.

$$\text{span}(h_1^+, \ldots, h_K^+) \perp \text{span}(\dot{h}_1^+, \ldots, \dot{h}_K^{30}) \qquad [\text{Eqn. 12}]$$

where span( ) denotes a vector space to which vectors inside brackets extend, and $\perp$ denotes orthogonality. That is, a shift pre-process is applied as in Equation 13 so that two vector spaces are nearly orthogonal.

$$\tilde{x} = \frac{1}{\gamma} \tilde{H}^+ \begin{bmatrix} 1 & 0 & \ldots & 0 \\ 0 & e^{j\theta_2} & \ddots & \vdots \\ \vdots & \ddots & \ddots & 0 \\ 0 & \ldots & 0 & e^{j\theta_K} \end{bmatrix} (\tilde{u} + \tau \tilde{I}) = \frac{1}{\gamma} \tilde{H}_\theta^+ (\tilde{u} + \tau \tilde{I}) \qquad [\text{Eqn. 13}]$$

When shift pre-process is applied as in Equation 13, Equation 10 may be expressed by Equation 14:

$$R\{\tilde{I}_{opt}\} \approx \arg\min_{l \in Z^K} \left\| r_\theta - H_e^\theta \begin{bmatrix} 1_1 \\ \vdots \\ 1_K \end{bmatrix} \right\|^2 \& \qquad [\text{Eqn. 14}]$$

$$I\{\tilde{I}_{opt}\} \approx \arg\min_{l \in Z^K} \left\| \dot{r}_\theta - \dot{H}_e^\theta \begin{bmatrix} 1_1 \\ \vdots \\ 1_K \end{bmatrix} \right\|^2$$

Here, $r_\theta$, $\dot{r}\theta$, $\dot{H}_e$ are given by Equation 15:

$$r_\theta = \sum_{i=1}^{K} h_{i,\theta}^+ u_{i,I}, \; H_e^\theta = -\tau[h_{1,\theta}^+ \; \ldots \; h_{k,\theta}^+], \qquad [\text{Eqn. 15}]$$

$$\dot{r}_\theta \sum_{i=1}^{K} \dot{h}_{i,\theta}^+ u_{i,Q}, \; \dot{H}_e^\theta = -\tau[\dot{h}_{1,\theta}^+ \; \ldots \; \dot{h}_{k,\theta}^+]$$

$h_{i,e}^+$ and $\dot{h}_{i,e}^+$ are determined by Equation 16:

$$[h_{1,\theta}^+ \; \ldots \; h_{K,S}^+ \; \dot{h}_{1,\theta}^+ \; \ldots \; \dot{h}_{K,\theta}^+] = [h_1^+ \; \ldots \; h_K^+ \; \dot{h}_1^+ \; \ldots \; \dot{h}_K^+] \qquad [\text{Eqn. 16}]$$

$$\begin{bmatrix} \text{diag}(1, \cos\theta_2, \ldots, \cos\theta_K) & -\text{diag}(0, \sin\theta_2, \ldots, \sin\theta_K) \\ \text{diag}(0, \sin\theta_2, \ldots, \sin\theta_K) & \text{diag}(1, \cos\theta_2, \ldots, \cos\theta_K) \end{bmatrix}$$

where diag ( ) is a diagonal matrix whose diagonal elements are elements inside brackets.

That is, directionality between $\text{span}(h_1^+, h_K^+)$ and $\text{span}(\dot{h}_1^+, \ldots, \dot{h}_K^{30})$ is made nearly orthogonal as much as possible by controlling $\theta_2, \ldots, \theta_K$, so that a loss by Equation 13 is minimized.

A representative criterion of orthogonality between two vector spaces is Chordal distance, which is defined by Equation 17:

$$\text{dist}(\text{span}(h_{1,\theta}^+, \ldots, h_{K,\theta}^+), \text{span}(\dot{h}_{1,\theta}^+, \ldots, \dot{h}_{K,\theta}^+)) \approx K - \|Q^T \dot{Q}\|_F^2 \qquad [\text{Eqn. 17}]$$

Here, column vectors of Q include unit orthogonal basis vectors of $\text{span}(h_{1,\theta}^+, \ldots, h_{K,\theta}^+)$. That is, column vectors of Q are orthogonal to one another and are 1 in size, and can express all vectors of $\text{span}(h_{1,\theta}^+, \ldots, h_{K,\theta}^+)$ through linear combination of them. Likewise, column vectors of $\dot{Q}$ include unit orthogonal basis vectors of $\dot{h}_{1,\theta}^+, \ldots, \dot{h}_{K,\theta}^+$.

Here, $\theta_2, \ldots, \theta_K$ may be optimized through a repetitive algorithm.

According to another exemplary embodiment, $\theta_2, \ldots, \theta_K$ may be optimized through an algorithm 1 below.

---

Algorithm 1

For i=2:K $$\theta_i = \tan^{-1}\left(\frac{h_1^{+T} \dot{h}_i^+}{h_1^{+T} h_i^+}\right)$$

end

---

Orthogonality may be maintained as in Equation 18 through the above algorithm.

$$h_{1,\theta}^+ \perp \text{span}(\dot{h}_{1,\theta}^+, \ldots, \dot{h}_{K,\theta}^+) \& \dot{h}_{1,\theta}^+ \perp \text{span}(h_{1,\theta}^+, \ldots, h_{K,\theta}^+) \qquad [\text{Eqn. 18}]$$

That is, to calculate the phase angles $\theta_2, \ldots, \theta_K$, one of K phase angles is selected from a real vector space and fixed (that is, a phase angle is set to zero), and a phase angle is determined such that one pseudo inverse matrix corresponding to the selected phase angle of the real vector space, and K pseudo inverse matrixes corresponding to K phase angles of an imaginary vector space are orthogonal. In addition, one of K phase angles is selected from an imaginary vector space and fixed (that is, a phase angle is set to zero), and a phase angle is determined such that one pseudo inverse matrix corresponding to the selected phase angle of the imaginary vector space, and K pseudo inverse matrixes corresponding to K phase angles of a real vector space are orthogonal (referring to Equation 18).

Figure 3:
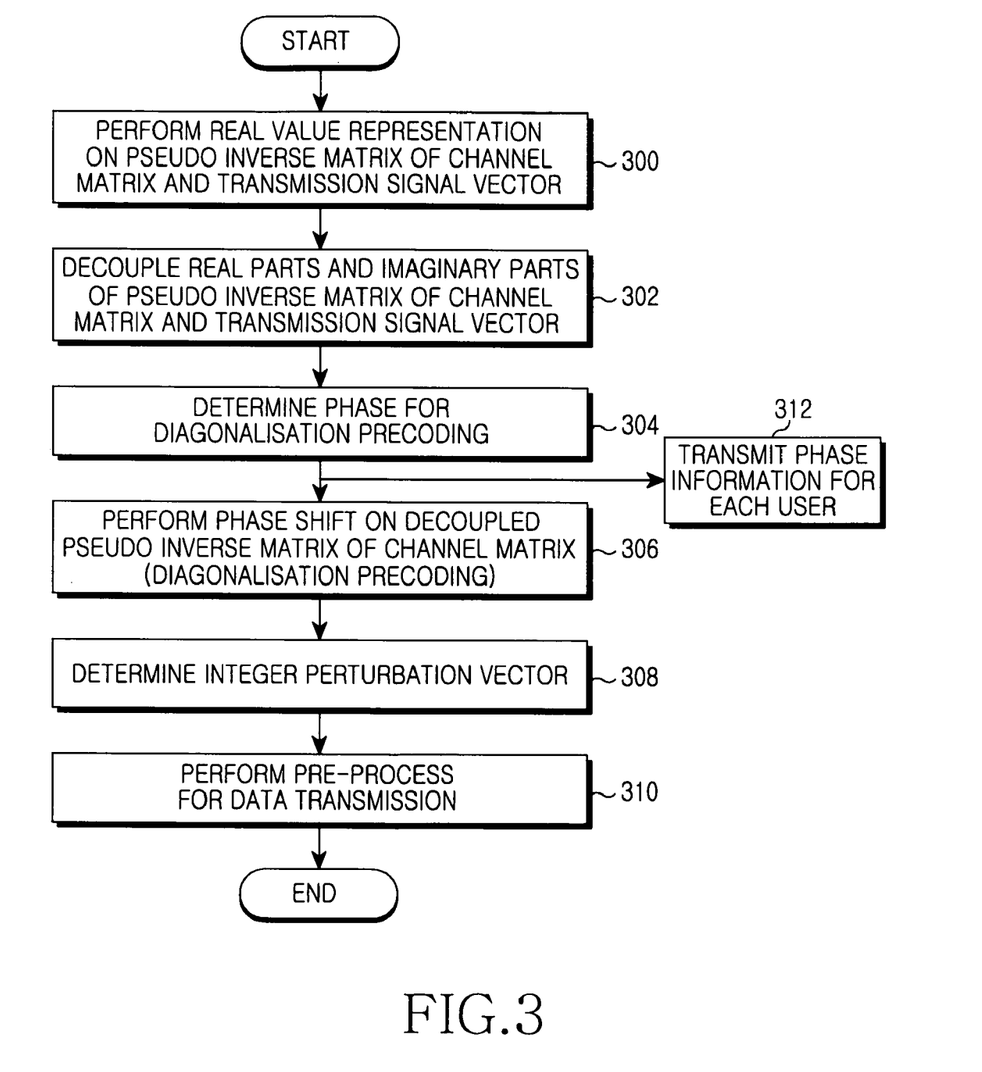
FIG. 3 illustrates an operation of a transmitter for determining an optimum integer perturbation vector of a low complexity in a multiple antenna system according to an exemplary embodiment of the present invention.

FIG. 3 illustrates an operation of a transmitter for determining an optimum integer perturbation vector of a low complexity in a multiple antenna system according to an exemplary embodiment of the present invention.

Referring to FIG. 3, the decoupler 110 expresses a transmission signal vector and a pseudo inverse matrix of a channel matrix using real value representation in step 300.

The decoupler 110 decouples real parts and imaginary parts of the transmission signal vector and the pseudo inverse matrix of the channel matrix in step 302.

The phase determination unit 114 determines phase angles $\theta_1, \ldots, \theta_K$ for respective K bit streams so that a real vector space and an imaginary vector space for the pseudo inverse matrix of the channel matrix are orthogonal in order to reduce a loss generated when a real part and an imaginary part of an integer perturbation vector are decoupled in step 304. Here, an optimum phase angle may be obtained through a repetitive algorithm (referring to Equation 12).

According to another exemplary embodiment, to calculate the phase angle, one of K phase angles is selected from a real vector space and fixed (that is, a phase angle is set to zero), and a phase angle is determined such that one pseudo inverse matrix corresponding to the selected phase angle of the real vector space, and K pseudo inverse matrixes corresponding to K phase angles of an imaginary vector space are orthogonal. In addition, one of K phase angles is selected from an imaginary vector space and fixed (that is, a phase angle is set to zero), and a phase angle is determined such that one pseudo inverse matrix corresponding to the selected phase angle of the imaginary vector space, and K pseudo inverse matrixes corresponding to K phase angles of a real vector space are orthogonal (referring to Equation 18).

The shift pre-processor 104 performs phase shift (referred to as diagonalisation pre-coding) on a pseudo inverse matrix of a channel matrix using the determined K phase angles in step 306.

The perturbation vector determination unit 112 determines a real value and an imaginary value of a perturbation vector using decoupled real parts and imaginary parts of the pseudo inverse matrix of the channel matrix and the transmission signal vector in step 308. That is, the perturbation vector determination unit 112 determines an optimum perturbation vector from phase-shifted results of decoupled real parts and imaginary parts of the pseudo inverse matrix of the channel matrix and the transmission signal vector from the shift pre-processor 104 (referring to Equations 7 and 11).

The modulo pre-processor 102 receives K complex data signal (or modulation symbol) and perturbs the transmission signal vector using the integer perturbation vector in order to prevent a transmission power increase phenomenon generated by ZF pre-processing (that is, to prevent an inverse matrix of a channel matrix from diverging), and the ZF pre-processor 106 multiplies a transmission signal by the pseudo inverse matrix of the channel matrix and outputs the same in step 310.

The transmitter transmits the K phase angles determined in step 304 to a relevant user via unicasting or broadcasting in step 312.

After that, the procedure ends.

Figure 4:
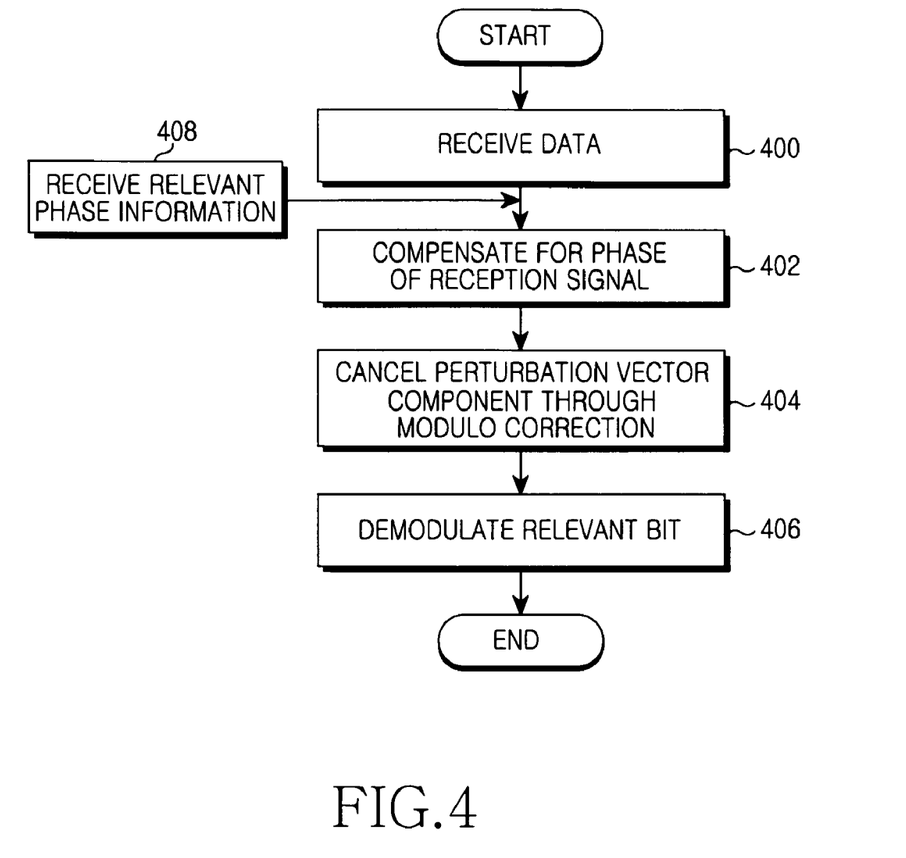
FIG. 4 illustrates an operation of a receiver for determining an optimum integer perturbation vector of a low complexity in a multiple antenna system according to an exemplary embodiment of the present invention.

FIG. 4 illustrates an operation of a receiver for determining an optimum integer perturbation vector of a low complexity in a multiple antenna system according to an exemplary embodiment of the present invention.

Referring to FIG. 4, the receiver receives data via reception antennas in step 400. The shift correctors 200_1 to 200_K cancel an effect of shift pre-process performed by the transmitter on a reception signal in step 402. In other words, since a phase shift has been performed for respective K bit streams in order to reduce system performance deterioration generated when the transmitter decouples a real part and an imaginary part of a pseudo inverse matrix of a channel matrix, the shift correctors perform compensation on the phase shift.

The modulo correctors 204_1 to 204_K correct an effect of a modulo pre-process performed by the transmitter in step 404. In other words, since the transmitter adds an integer perturbation vector to a transmission vector in order to prevent a power increase phenomenon generated by a ZF pre-process, the receiver cancels the integer perturbation vector added to the transmission vector through a modulo operation.

The demodulators 206_1 to 206_K demodulate a relevant bit from a reception signal vector from which an integer perturbation vector component has been cancelled in step 406.

The receiver receives phase angle information unicast or broadcast from the transmitter in step 408.

After that, the procedure ends.

As described above, a pseudo inverse matrix of a channel matrix and a transmission signal vector are represented using real value representation in a multiple antenna system, and real parts and imaginary parts of them are decoupled, so that complexity may be reduced in determining an optimum integer perturbation vector. In addition, diagonalisation pre-coding is performed, so that performance deterioration generated by decoupling of real parts and imaginary parts of a pseudo inverse matrix of a channel matrix and a transmission signal vector may be minimized.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A transmitter capable of transmitting data using an optimum integer perturbation vector of a low complexity in a multiple antenna system, the transmitter comprising:
   a modulo pre-processor configured to add an integer perturbation vector to a transmission signal vector;
   a shift pre-processor configured to phase-shift a pseudo inverse matrix of a channel matrix using a phase angle; and
   a precoder configured to precode a transmission signal vector perturbed by the integer perturbation vector using the phase-shifted pseudo inverse matrix of the channel matrix.

2. The transmitter of claim 1, further comprising:
   a decoupler configured to decouple a first channel vector and a second channel vector of the pseudo inverse matrix of a channel matrix, and decouple a real part and an imaginary part of a transmission signal vector.

3. The transmitter of claim 2, further comprising:
   a perturbation vector determination unit configured to determine a real value and an imaginary value of the integer perturbation vector independently based on a first Equation by coupling with the decoupled first channel vector and the decoupled real part of the transmission signal vector, and couple with the decoupled second channel vector and the decoupled imaginary part of the transmission signal vector, wherein the first equation is defined as:

$$R\{\tilde{l}_{opt}\} \approx \arg\min_{l \in Z^K} \left\| r - H_e \begin{bmatrix} 1_1 \\ \vdots \\ 1_K \end{bmatrix} \right\|^2 \&$$

$$I\{\tilde{l}_{opt}\} \approx \arg\min_{l \in Z^K} \left\| \dot{r} - \dot{H}_e \begin{bmatrix} 1_1 \\ \vdots \\ 1_K \end{bmatrix} \right\|^2$$

-continued where $$r = \sum_{i=1}^{K} h_i^+ u_{i,I}, \quad H_e = -\tau[h_1^+ \ldots h_K^+], \quad \dot{r} = \sum_{i=1}^{K} \dot{h}_i^+ u_{i,Q},$$

$$\dot{H}_e = -\tau[\dot{h}_1^+ \ldots \dot{h}_K^+].$$

4. The transmitter of claim 3, wherein the first channel vector and the second channel vector are defined by a second and third Equation, wherein the second equation is:

$$h_i^+ = [R\{\tilde{h}_i^+\}^T I\{\tilde{h}_i^+\}^T]^T,$$

and the third equation is:

$$\dot{h}_i^+ = [-I\{\tilde{h}_i^+\}^T R\{\tilde{h}_i^+\}^T]^T$$

where $h_i^+$ is the first channel vector, $\dot{h}_i^+$ is the second channel vector, $R\{\}$ denotes a real part, $I\{\}$ denotes an imaginary part, $[A]^T$ denotes a transpose matrix of a matrix A, and $\tilde{h}_i^+$ is an i-th column vector of $\tilde{H}^+$.

5. The transmitter of claim 1, wherein the phase angle is determined through a repetitive process defined using:

$$\theta_i = \tan^{-1}\left(\frac{h_1^{+T} \dot{h}_i^+}{h_1^{+T} h_i^+}\right).$$

6. The transmitter of claim 1, wherein the phase angle is determined based on:

$$h_{1,\theta}^+ \perp \text{span}(\dot{h}_{1,\theta}^+, \ldots, \dot{h}_{K,\theta}^+) \ \& \ \dot{h}_{1,\theta}^+ \perp \text{span}(h_{1,\theta}^+, \ldots, h_{K,\theta}^+)$$

where $h_{1,\theta}^+$ is a phase-shifted first channel vector, and $\dot{h}_{1,\theta}^+$ is a phase-shifted second channel vector.

7. A method for transmitting data using an optimum integer perturbation vector of a low complexity in a multiple antenna system, the method comprising:
  adding an integer perturbation vector to a transmission signal vector;
  phase-shifting a pseudo inverse matrix of a channel matrix using a phase angle; and
  precoding a transmission signal vector perturbed by the integer perturbation vector using the phase-shifted pseudo inverse matrix of the channel matrix.

8. The method of claim 7, further comprising:
  decoupling a first channel vector and a second channel vector of the pseudo inverse matrix of a channel matrix, and decoupling a real part and an imaginary part of a transmission signal vector; and
  determining a real value and an imaginary value of the integer perturbation vector independently based on a first equation by coupling with the decoupled first channel vector and the decoupled real part of the transmission signal vector, and coupling with the decoupled second channel vector and the decoupled imaginary part of the transmission signal vector, wherein the first equation is defined as:

$$R\{\tilde{l}_{opt}\} \approx \arg\min_{l \in Z^K} \left\| r - H_e \begin{bmatrix} l_1 \\ \vdots \\ l_K \end{bmatrix} \right\|^2 \ \& \ I\{\tilde{l}_{opt}\} \approx \arg\min_{l \in Z^K} \left\| \dot{r} - \dot{H}_e \begin{bmatrix} l_1 \\ \vdots \\ l_K \end{bmatrix} \right\|^2$$

where $$r = \sum_{i=1}^{K} h_i^+ u_{i,I}, \quad H_e = -\tau[h_1^+ \ldots h_K^+], \quad \dot{r} = \sum_{i=1}^{K} \dot{h}_i^+ u_{i,Q},$$

$$\dot{H}_e = -\tau[\dot{h}_1^+ \ldots \dot{h}_K^+].$$

9. The method of claim 8, wherein the first channel vector and the second channel vector are defined by a second equation defined as:

$$h_i^+ = [R\{\tilde{h}_i^+\}^T I\{\tilde{h}_i^+\}^T]^T, \text{ and}$$

a third equation defined as:

$$\dot{h}_i^+ = [-I\{\tilde{h}_i^+\}^T R\{\tilde{h}_i^+\}^T]^T$$

where $h_i^+$ is the first channel vector, $\dot{h}_i^+$ is the second channel vector, $R\{\}$ denotes a real part, $I\{\}$ denotes an imaginary part, $[A]^T$ denotes a transpose matrix of a matrix A, and $\tilde{h}_i^+$ is an i-th column vector of $\tilde{H}^+$.

10. The method of claim 7, wherein the phase angle is determined through a repetitive process based on:
  for i=2:K, $$\theta_i = \tan^{-1}\left(\frac{h_1^{+T} \dot{h}_i^+}{h_1^{+T} h_i^+}\right).$$

11. The method of claim 7, wherein the phase angle is determined based on a third equation defined as:

$$h_{1,\theta}^+ \perp \text{span}(\dot{h}_{1,\theta}^+, \ldots, \dot{h}_{K,\theta}^+) \ \& \ \dot{h}_{1,\theta}^+ \perp \text{span}(h_{1,\theta}^+, \ldots, h_{K,\theta}^+)$$

where $h_{1,\theta}^+$ is a phase-shifted first channel vector and $\dot{h}_{1,\theta}^+$ is a phase-shifted second channel vector.

* * * * *